(12) United States Patent
Mueller et al.

(10) Patent No.: US 10,882,401 B2
(45) Date of Patent: Jan. 5, 2021

(54) OPERATOR CONTROL APPARATUS FOR OUTPUTTING HAPTIC FEEDBACK, MOTOR VEHICLE AND METHOD

(71) Applicants: Volkswagen Aktiengesellschaft, Wolfsburg (DE); AUDI AG, Ingolstadt (DE)

(72) Inventors: Ulrich Mueller, Ingolstadt (DE); Dominik Ulrich, Wolfsburg (DE); Christoph Boese, Vechelde (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 16/758,268

(22) PCT Filed: Oct. 25, 2018

(86) PCT No.: PCT/EP2018/079311
§ 371 (c)(1),
(2) Date: Apr. 22, 2020

(87) PCT Pub. No.: WO2019/081652
PCT Pub. Date: May 2, 2019

(65) Prior Publication Data
US 2020/0338982 A1 Oct. 29, 2020

(30) Foreign Application Priority Data
Oct. 26, 2017 (DE) .................. 10 2017 219 236

(51) Int. Cl.
*B60K 35/00* (2006.01)
*G06F 3/00* (2006.01)
*G06F 3/01* (2006.01)

(52) U.S. Cl.
CPC .............. *B60K 35/00* (2013.01); *G06F 3/016* (2013.01); *B60K 2370/12* (2019.05); *B60K 2370/157* (2019.05); *B60K 2370/158* (2019.05)

(58) Field of Classification Search
CPC .............. B60K 35/00; B60K 2370/158; B60K 2370/12; B60K 2370/157; G06F 3/016
See application file for complete search history.

(56) References Cited

U.S. PATENT DOCUMENTS

| | | | |
|---|---|---|---|
| 9,698,775 B2 * | 7/2017 | Fust | H03K 17/975 |
| 2006/0072770 A1 * | 4/2006 | Miyazaki | H04R 19/02 |
| | | | 381/116 |

(Continued)

FOREIGN PATENT DOCUMENTS

| | | | | |
|---|---|---|---|---|
| DE | 102014018350 A1 | 6/1916 | ............. | B60R 16/02 |
| DE | 10 2006 021 593 A1 | 11/2007 | ............. | B60R 16/02 |

(Continued)

OTHER PUBLICATIONS

International Preliminary Report on Patentability, Application No. PCT/EP2018/079311, 14 pages, dated Apr. 28, 2020.

(Continued)

*Primary Examiner* — Thomas D Alunkal
(74) *Attorney, Agent, or Firm* — Slayden Grubert Beard PLLC

(57) ABSTRACT

The invention relates to an operator control apparatus for outputting haptic feedback comprising an operator control surface, an actuator, which is at least indirectly coupled to the operator control surface, for generating the haptic feedback on the operator control surface and a control unit which is designed to drive the actuator by means of a haptic component of a control signal for generating the haptic feedback. In this case, the control unit is designed to drive (Continued)

the actuator by means of an acoustic component of the control signal for generating acoustic feedback.

13 Claims, 2 Drawing Sheets

(56) References Cited

U.S. PATENT DOCUMENTS

| | | | | |
|---|---|---|---|---|
| 2010/0060437 | A1* | 3/2010 | Steckel | G06F 3/016 340/407.2 |
| 2012/0112894 | A1* | 5/2012 | Yang | G06F 3/016 340/407.1 |
| 2014/0232657 | A1* | 8/2014 | Aviles | G06F 3/016 345/173 |
| 2014/0267148 | A1* | 9/2014 | Luna | G06F 1/3231 345/174 |
| 2016/0269827 | A1* | 9/2016 | Casset | B06B 1/02 |
| 2017/0021762 | A1* | 1/2017 | Daman | B60K 35/00 |
| 2017/0024011 | A1* | 1/2017 | Dabic | B60K 37/06 |
| 2017/0220118 | A1* | 8/2017 | Dabic | G06F 3/04886 |
| 2019/0141453 | A1* | 5/2019 | Kim | H03F 3/187 |

FOREIGN PATENT DOCUMENTS

| | | | | |
|---|---|---|---|---|
| DE | 10 2008 046 102 A1 | 3/2010 | | B60R 16/02 |
| WO | 2019/081652 A1 | 5/1919 | | B60K 35/00 |
| WO | 2015/086568 A1 | 6/2015 | | G01D 5/241 |

OTHER PUBLICATIONS

Search Report for International Application No. PCT/EP2018/079311. 12 pages, dated Dec. 7, 2018.

* cited by examiner

OPERATOR CONTROL APPARATUS FOR OUTPUTTING HAPTIC FEEDBACK, MOTOR VEHICLE AND METHOD

CROSS-REFERENCE TO RELATED APPLICATIONS

This application claims priority to German Patent Application No. DE 10 2017 219 236.4, filed on Oct. 26, 2017 with the German Patent and Trademark Office. The contents of the aforesaid Patent Application are incorporated herein for all purposes.

TECHNICAL FIELD

The invention relates to an operator control apparatus for outputting a haptic feedback, to a motor vehicle and to a method. For assisting the operator control of operator control surfaces, actuators are arranged on the operator control surface, whereby it is possible to give haptic feedbacks to the user during the operator control. This is effected by exciting the touch-sensitive surface to a vibration by means of the actuator. For example, a touch-sensitive surface can be a touchscreen or a touchpad. The vibrations may for example have frequencies between 40-300 Hz because the highest excitability with vibrations in the skin is present in the said range. Haptic feedbacks are for example effected upon actuation of a virtual button to thus imitate an actuation of a mechanical button.

BACKGROUND

Besides the output of a haptic feedback, it is usual to reproduce an acoustic feedback, which is modelled on a click sound of a mechanical button, to thus imitate an actuation of a mechanical button. According to the current prior art, it is therein required to use a loudspeaker, which is for example arranged in the vicinity of the operator control surfaces. It is disadvantageous in this solution that an additional element is required hereto, whereby increased space requirement exists. If the loudspeaker is spaced from the operator control surface, the acoustic feedback reproduced by the loudspeaker can be perceived as unnatural by a user because the simulated sound source then deviates from the perceived sound source. This phenomenon in particular occurs if the acoustic feedback includes frequencies, which are in the upper range of the audible spectrum.

In DE 10 2014 018 350 A1, a motor vehicle operator control apparatus with button operator control and character input is described. Therein, an actuator can include a loudspeaker, which is configured to output a sound.

In US 2017/0021762 A1, a haptic system and a method for controlling the haptic system are described. Therein, it is provided to use an unbalance actuator for generating a haptic feedback upon actuation of an operator control surface.

In WO 2015/086568 A1, an operator control device for an electrical appliance, in particular for a vehicle component, is described. Therein, a haptic feedback is generated by means of an unbalance motor.

SUMMARY

An object of the invention is to provide a source of acoustic feedback integrated in an operator control surface.

This object is solved by a operator control apparatus, a motor vehicle, and a method for operating an operator control apparatus according to the independent claims.

Embodiments of the invention are the discussed in the dependent claims and the following description.

DETAILED DESCRIPTION

Figure 1:
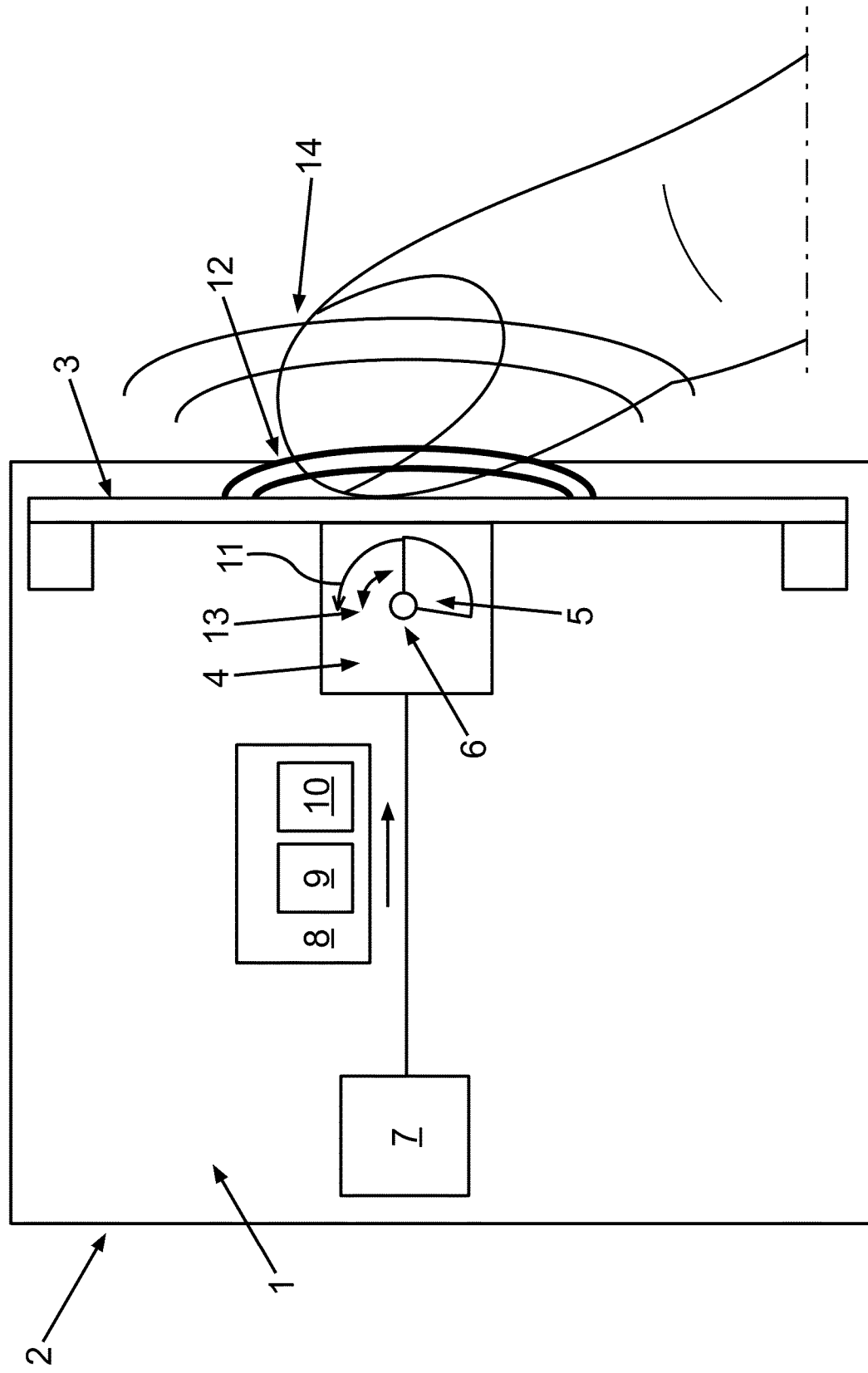
FIG. 1 shows an operator control apparatus in a motor vehicle.

According to a first exemplary aspect, an operator control apparatus for outputting a feedback is provided. The operator control apparatus includes an operator control surface, an actuator at least indirectly coupled to the operator control surface for generating a haptic feedback on the operator control surface and a control unit, which is configured to control the actuator by means of a haptic component of a control signal for generating the haptic feedback. The control unit is also configured to drive the actuator by means of an acoustic component of the control signal for generating an acoustic feedback. The operator control apparatus includes a control unit, which is configured to drive an actuator by means of a control signal. The actuator is immediately or at least indirectly arranged on an operator control surface. The control signal includes an acoustic component and a haptic component. The actuator is driven by means of the haptic component such that a haptic feedback is generated on the operator control surface. The actuator is driven by means of the acoustic component such that an acoustic feedback is generated. Thereby, the benefit arises that both the acoustic and the haptic feedback are generated by the actuator. For example, it is possible that the control unit is a microcontroller or a microprocessor, which is configured to generate the control signal. For example, the actuator may be a component, which is configured to excite to a mechanical oscillation according to the control signal by means of a piston or an armature. For example, the actuator may be directly arranged on the rear side of the operator control surface. In this case, it is directly coupled to the operator control surface so that the mechanical oscillations are directly transferred to the operator control surface. For example, the actuator may also be arranged at a bracket of the operator control surface. In this case, it is indirectly coupled to the operator control surface such that the mechanical oscillations may be transferred to the operator control surface via the bracket. For example, the operator control surface may be a touch-sensitive surface, such as a touch-sensitive screen surface. The haptic component of the control signal is that component, which defines the haptic feedback. The frequencies and the amplitudes of the haptic feedback may be selected such that they may be perceived by the human skin on the operator control surface. The acoustic component of the control signal is that component, which defines the acoustic feedback. The acoustic component may be defined such that it describes a mechanical oscillation of the actuator and/or the operator control surface in a frequency range of 0-22,000 Hz.

An embodiment provides that the actuator is configured as a DC voltage unbalance actuator. In other words, the actuator is an electric motor, which includes an armature with a not rotationally symmetric mass such that the armature has an unbalance upon rotation, which excites the actuator to a mechanical oscillation. Therein, the electric motor is driven by a DC voltage. Such an actuator is also known as an eccentric rotating mass actuator. Thereby, the benefit arises that a greater frequency range is covered by the actuator than it is possible with linear resonance actuators.

Another embodiment provides that the haptic component is a DC voltage component of the control signal and the acoustic component is an AC voltage component of the control signal. In other words, the control signal includes a DC voltage component, which represents the haptic component of the control signal, and an AC voltage component, which represents the acoustic component of the control signal. Thereby, the benefit arises that the control signal includes a haptic component relating to the angular velocity of the actuator and an acoustic component relating to a periodic variation of the angular velocity of the actuator in a DC voltage unbalance actuator. Thus, it is possible that the haptic feedback is generated by the unbalance of the actuator and the frequency of the haptic feedback is dependent on the angular velocity of the actuator, which is in turn dependent on the DC voltage component of the control signal. The acoustic feedback may be generated by vibrations, which are caused by the AC voltage component of het control signal, whereby the angular velocity of the actuator is varied.

Another embodiment provides that the control unit is configured to excite an armature of the actuator to a mechanical oscillation for generating the acoustic feedback by means of the acoustic component of the control signal. In other words, the control unit is configured to generate the acoustic component of the control signal such that an armature of the actuator generates the acoustic feedback by means of a mechanical oscillation. Thereby, the benefit arises that an additional frequency range may be covered by the use of the armature compared to the entire actuator. Thus, it is possible that the armature is accelerated by the acoustic component of the control signal such that it oscillates at a resonant frequency of the armature and thereby generates the acoustic feedback.

Another embodiment provides that the actuator executes a rotation or reciprocating movement with an actuator period duration depending on the haptic component and the acoustic component includes oscillations, the period duration of which is shorter than an actuator period duration. In other words, the acoustic component includes oscillations, the frequencies of which are higher than the frequency of the actuator. Thereby, the benefit arises that the actuator may be excited to oscillations, which have higher frequencies than an operating frequency of the actuator. Thus, it is possible that the actuator is operated with a predetermined period duration for generating the haptic feedback. Therein, the acoustic component of the control signal may include oscillations, the period duration of which is shorter than the period duration of a revolution of the actuator. Thus, it is possible that the actuator for example has a revolution frequency of 50 Hz, and the acoustic component includes an oscillation of a frequency of 100 Hz.

Another embodiment provides that the operator control apparatus is configured to output an acoustic feedback at least in a frequency range of 1 to 5 kHz. In other words, audio sound in a frequency range of at least 1 to 5 kHz may be output as the acoustic feedback by the operator control apparatus. Thereby, the benefit arises that the operator control apparatus can emit audio sound, which includes the frequencies usual in acoustic feedbacks. Thus, it is possible that the actuator is configured to vibrate in a frequency range of at least 1 to 5 kHz and to output these vibrations as acoustic feedback or to excite the operator control surface to an oscillation in a frequency range of at least 1 to 5 kHz such that it outputs a feedback.

Another embodiment provides that the operator control apparatus is configured to generate the acoustic feedback by means of oscillation excitation of the operator control surface by the actuator. In other words, the operator control apparatus is configured such that the operator control surface is constituted such that it may be excited to an oscillation by the actuator at least in the frequency range of the acoustic feedback to thus output the acoustic feedback. Thereby, the benefit arises that the operator control surface can be used as a loudspeaker membrane.

The invention also concerns a motor vehicle, which includes one or more of the operator control apparatus as discussed in the preceding. The motor vehicle may be an automobile such as for example a passenger car or a truck.

A further exemplary aspect concerns a method for operating an operator control apparatus. Therein, it is provided that a control signal including a haptic component is generated by a control unit and an actuator at least indirectly coupled to an operator control surface is driven by means of the control signal. According to the haptic component of the control signal, a haptic feedback is generated on the operator control surface by the actuator. The control signal also includes an acoustic component, wherein the actuator generates an acoustic feedback according to the acoustic component of the control signal. In other words, a control signal is generated by the control unit of the operator control apparatus, which includes a haptic component and an acoustic component. By means of the control signal, the actuator of the operator control apparatus arranged on the operator control surface is driven by the control unit. The actuator generates a haptic feedback on the operator control surface according to the haptic component of the control signal. The actuator generates an acoustic feedback according to the acoustic component of the control signal. Thereby, the benefit arises that a haptic feedback and an acoustic feedback can be output by the operator control apparatus. Thus, it is possible that the control unit generates a control signal for driving an actuator configured as a linear resonance actuator. The haptic component of the control signal may be an oscillation with 40-300 Hz, by which the actuator may be operated. The frequency of the haptic component may correspond with the resonant frequency of the actuator. The actuator may perform a vibration with 40-300 Hz, which may transfer to the operator control surface and may generate the haptic feedback on the operator control surface. The acoustic component of the control signal may include one or more oscillations, which superimpose on the oscillation of the control signal. These oscillations may include frequencies above 300 Hz, whereby an oscillation of the actuator may be superimposed by oscillations of the acoustic component. Thus, the oscillation of the actuator may be non-uniformly effected, whereby additional vibrations may be effected, which may result in an output of the acoustic feedback.

Embodiments of the method and of the motor vehicle, which comprise features as they were already described in the preceding in context of the embodiments of the operator control apparatus, also belong to the invention. For this reason, the corresponding embodiments of the method and of the motor vehicle are not again described here.

Further exemplary embodiments of the invention are described in the following. Other variations to the disclosed embodiments can be understood and effected by those skilled in the art in practicing the claimed invention, from a study of the drawings, the disclosure, and the appended claims. In the FIGS., functionally identical elements are each provided with the same reference characters.

FIG. 1 shows an operator control apparatus 1 in a motor vehicle 2. The operator control apparatus 1 may include an operator control surface 3. Therein, it may for example be a touch-sensitive surface (touchscreen or touchpad) or a surface of a button. The operator control apparatus 1 may include an actuator 4, which may be at least indirectly coupled to the operator control surface 3. This may for example mean that the actuator 4 is directly attached to the operator control surface 3 such that mechanical oscillations generated by it are directly transferred to the operator control surface 3 or that the actuator 4 is attached to an element, by which the mechanical oscillations are transferred to the operator control surface. The actuator 4 illustrated in FIG. 1 is a DC voltage unbalance actuator. However, the actuator 4 may also be configured as a piezo actuator, as a linear resonance actuator 4 or as a solenoid actuator 4. The actuator 4 may include an armature 5, which is constituted such that a rotational axis 6 of the actuator 4 does not extend through the center of gravity of the armature 5. Thus, a rotation of the armature 5 may result in an unbalance, whereby the actuator 4 may vibrate. The vibration may be transferred to the operator control surface 3 such that it may be excited to an oscillation. The operator control apparatus 1 may also include a control unit 7. Therein, it may be a microprocessor or a microcontroller. The control unit 7 may be configured to drive the actuator 4 by means of a control signal 8. The control signal 8 may include a haptic component 9 and an acoustic component 10. The haptic component 9 of the control signal may be a DC voltage component of the control signal. The acoustic component 10 of the control signal 8 may be an AC voltage component of the control signal. The acoustic component 10 may include oscillations, the period duration of which is shorter than an actuator period duration. The actuator period duration may for example be a revolution time of the armature 5. The armature 5 of the actuator 4 may rotate with an angular velocity 11 according to the haptic component 9 of the control signal, whereby the actuator 4 may vibrate and transfer the vibrations to the operator control surface 3. The haptic feedback 12 defined in the haptic component 9 of the control signal is generated via the operator control surface 3. The acoustic component 10 of the control signal 8 may include multiple oscillations, which vary the angular velocity 11 defined by the haptic component 9. These variations 13 may cause additional oscillations in the armature 5 or in the actuator 4. These oscillations may be emitted as an acoustic feedback 14 from the actuator 4 itself and/or the operator control surface 3. The acoustic feedback 14 may include at least a frequency range of 1 kHz to 5 kHz.

Figure 2:
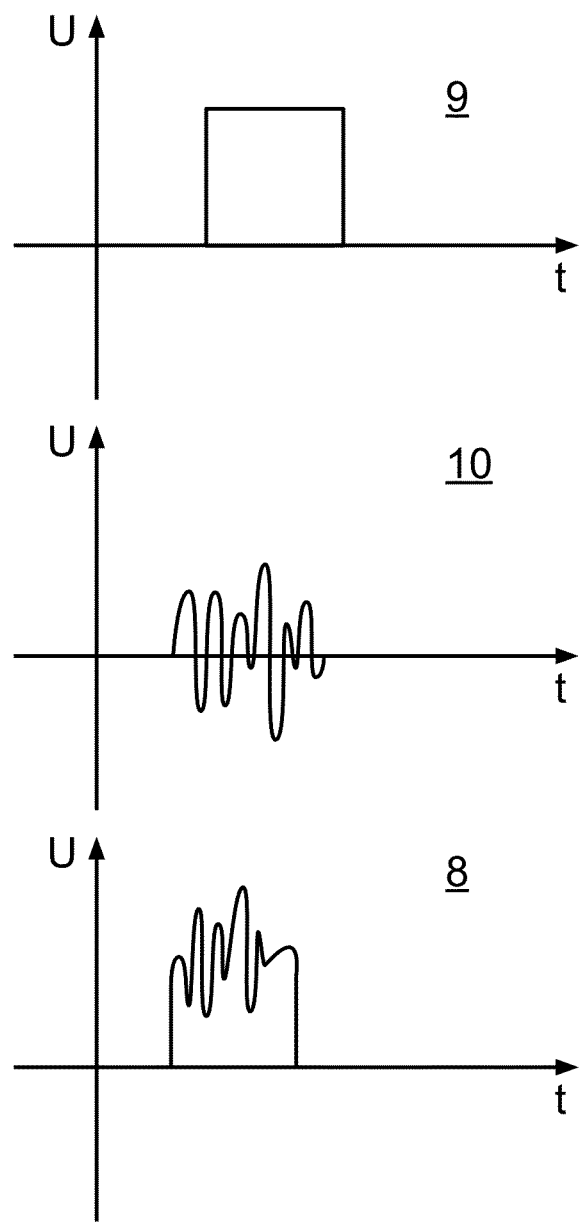
FIG. 2 shows a possible control signal.

FIG. 2 shows a possible control signal 8 for controlling the actuator. The control signal 8 may include a haptic component 9, wherein it may be a DC voltage component of the control signal. For example, the haptic component 9 may be configured as a step signal. The control signal 8 may also include an acoustic component 10 configured as an AC voltage signal. The acoustic component 10 may include oscillations, the period duration of which is shorter than an actuator period duration. The oscillations of the acoustic component 10 may for example include a resonant frequency of the armature 5. The control signal 8 may be a superposition of the haptic component 9 with the acoustic component 10. Therein, the two components may be constituted such that the voltage does not assume negative values.

Overall, the examples show how a source of an acoustic feedback integrated in an operator control surface 3 is provided by the present aspect.

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. An operator control apparatus for outputting a feedback, comprising:
    an operator control surface;
    an actuator at least indirectly coupled to the operator control surface, which is configured as a DC voltage unbalance actuator, for generating a haptic feedback on the operator control surface;
    a control unit, which is configured to control the actuator using a haptic component of a control signal for generating the haptic feedback;
    wherein the control unit is configured to drive the actuator using an acoustic component of the control signal for generating an acoustic feedback; and
    the haptic component is a DC voltage component of the control signal and the acoustic component is an AC voltage component of the control signal.

2. The operator control apparatus of claim 1, wherein the control unit is configured to excite an armature of the actuator to a mechanical oscillation by the acoustic component of the control signal for generating the acoustic feedback.

3. The operator control apparatus of claim 1, wherein the actuator executes a rotation or reciprocating movement with an actuator period duration depending on the haptic component and the acoustic component includes oscillations, the period duration of which is shorter than the actuator period duration.

4. The operator control apparatus of claim 1, wherein the operator control apparatus is configured to output an acoustic feedback at least in a frequency range of 1 kHz to 5 kHz.

5. The operator control apparatus of claim 1, wherein the operator control apparatus is configured to generate the acoustic feedback using an oscillation excitation of the operator control surface by the actuator.

6. A motor vehicle with an operator control apparatus of claim 1.

7. A method for operating an operator control apparatus, comprising
    generating, by a control unit, a control signal including a haptic component;
    driving, using the control signal, an actuator, which is at least indirectly coupled to an operator control surface, and which is configured as a DC voltage unbalance actuator;
    generating a haptic feedback on the operator control surface by the actuator according to the haptic component of the control signal; wherein the control signal including an acoustic component is generated by the control unit;
    an acoustic feedback is generated by the actuator according to the acoustic component of the control signal; and the haptic component is a DC voltage component of the control signal and the acoustic component is an AC voltage component of the control signal.

8. The operator control apparatus of claim 2, wherein the actuator executes a rotation or reciprocating movement with an actuator period duration depending on the haptic component and the acoustic component includes oscillations, the period duration of which is shorter than the actuator period duration.

9. The operator control apparatus of claim 2, wherein the operator control apparatus is configured to output an acoustic feedback at least in a frequency range of 1 kHz to 5 kHz.

10. The operator control apparatus of claim 3, wherein the operator control apparatus is configured to output an acoustic feedback at least in a frequency range of 1 kHz to 5 kHz.

11. The operator control apparatus of claim 2, wherein the operator control apparatus is configured to generate the acoustic feedback using an oscillation excitation of the operator control surface by the actuator.

12. The operator control apparatus of claim 3, wherein the operator control apparatus is configured to generate the acoustic feedback using an oscillation excitation of the operator control surface by the actuator.

13. The operator control apparatus of claim 4, wherein the operator control apparatus is configured to generate the acoustic feedback using an oscillation excitation of the operator control surface by the actuator.

* * * * *